Jan. 31, 1928.

G. L. MATHER

CORE

Filed Dec. 12, 1925

1,657,835

George L. Mather
Inventor

By
Attorney

Patented Jan. 31, 1928.

1,657,835

UNITED STATES PATENT OFFICE.

GEORGE L. MATHER, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

CORE.

Application filed December 12, 1925. Serial No. 75,052.

My invention relates to the manufacture of pneumatic tire casings and more particularly to a core upon which cord tire casings may be built and cured.

According to the usual practice casings of this type are built upon a core or former, removed therefrom a pneumatic tube commonly called an air bag inserted in the casing and the casing then cured in a suitable mold under internal pressure supplied by inflating the air bag. The purpose of the air bag is to stretch and condition the cord fabric of the carcass so that upon vulcanization the cords are properly positioned in the carcass. The life of the air bag is limited, the time and labor involved in removing the casing from the building core and inserting a bag therein substantial, and further expense is involved in inflating the bag during vulcanization.

It has been proposed to use a solid rubber core upon which the casing is both built and cured thus eliminating the above items of expense incident to the use of an air bag. With the core just described the necessary stretch is secured by the expansion of the solid core under heat and the use of core pads during the building operation.

It is the object of my invention to provide an improved type of solid core which will eliminate the use of core pads and provide a better control of the degree of stretch applied to the casing.

In the accompanying drawings which illustrate one embodiment of my invention.

Figure 1:
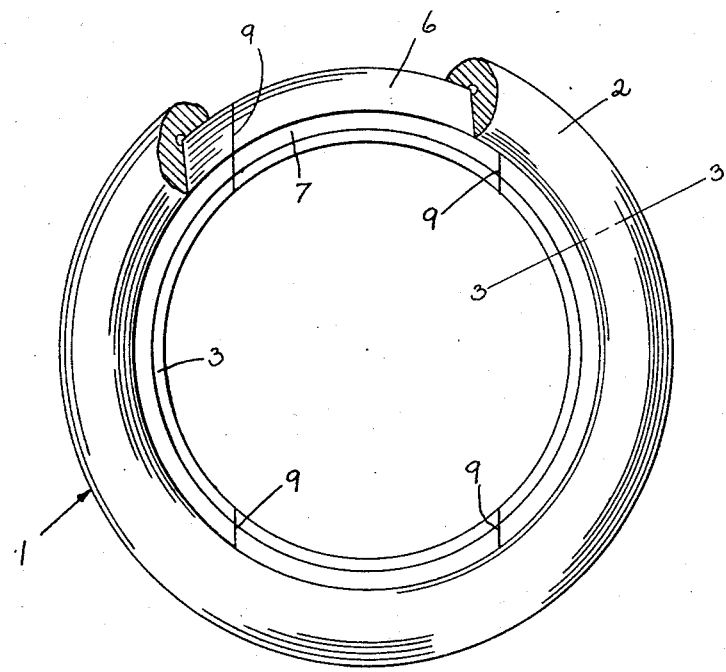
Figures 2, 3, 4:
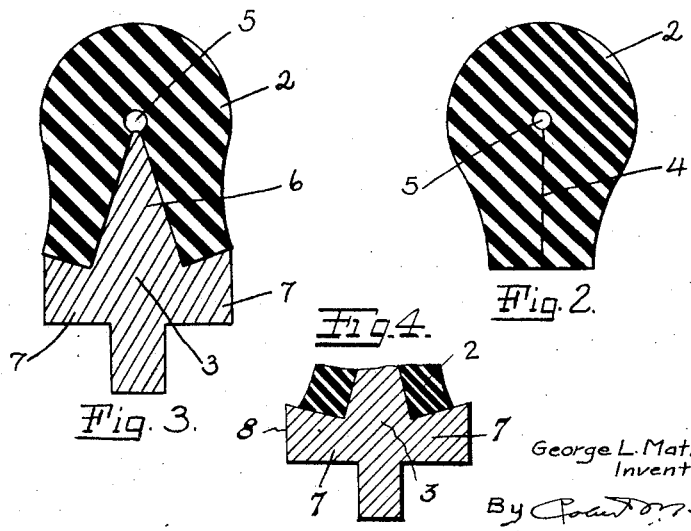

Figure 1 is a side elevation of my improved core, parts being broken away to better illustrate the parts, Figure 2 is a section of the curing element of the core, Figure 3 is a section on the line 3—3 of Figure 1, and Figure 4 is a fragmentary section similar to Figure 3, but showing a modified form.

Referring to the drawings 1 designates the core generally. As shown in Figures 1 and 3 the core comprises two elements namely a substantially solid rubber annular curing element 2 and an annular supporting ring 3. The element 2 which may be formed of the rubber compound or stock conventionally employed for air bags is shaped in its normal condition, as shown in Figure 2, to conform substantially to the inner contour of the casing to be cured. A split 4 is formed in the core element 2 extending from the inner circumference of the annulus to substantially the center of the core, where a channel 5 is formed to prevent the split 4 extending deeper into the core during use. The second element of the core, 3, is formed of any suitable material such as cast steel or iron and comprises an annular ring having wedge shaped portion 6 adapted to be inserted in the split 4 of element 2, and projection 7 engaging the bases of the separated portions of the element 2. As shown in Figure 3 the faces of projections 7 form a continuation of element 2, but if desired they may be extended as shown at 8 in Figure 4 to form bead positioning means. The element 3 is preferably cut in sections as at 9, the sections being secured to any suitable type of chuck adapted to collapse the sections.

The method of using the core is as follows. The ring 3 is expanded into the element 2 as shown in Figures 1 and 3, and the casing built therein in any conventional manner. As will be evident from Figure 3 the sides of the casing so built are separated in substantially the same manner as when core pads are used. The ring 3 is then collapsed, the element 2 assuming the shape shown in Figure 2. It will be obvious that the removal of wedge 6 and the return of element 2 to substantially normal shape is analogous to the removal of the core pads in the method previously discussed. Bead rings are now applied as in conventional practice, the bead rings drawing the beads inwardly and stretching the fabric. The assembly is now placed in a suitable mold and subjected to vulcanizing temperature, the expansion of the element 2 further stretching the fabric. The degree of stretch applied to the cords of the casing may be varied within reasonable limits by increasing or decreasing the width of wedge 6 at its base.

It will be evident that my invention provides an element 2 which in combination with ring 6 constitutes a building core having all the advantages of a solid rubber core plus separable core pads and that upon removal of the ring 3 element 2 functions as a curing core having all the advantages of a solid rubber core.

I claim:

1. In combination a collapsible annular support having a wedge shaped portion forming its outer periphery and provided with lateral projections at its base and a solid rubber annular core element split in the plane of the annulus from the inner periphery to substantially the cross-sectional center, mounted thereon with the wedge portion of the support engaged in said split.

2. A core element comprising a rubber annulus substantially solid in cross-section, split in the plane of the annulus from its inner periphery to substantially the center of its cross-section.

3. A core element comprising a rubber annulus substantially solid in cross-section, split in the plane of the annulus from its inner periphery to substantially the center of its cross-section, said split terminating in an annular channel.

4. A core element comprising a rubber annulus substantially solid in cross-section, shaped to conform substantially to the interior of a pneumatic tire casing, and split in the plane of the annulus from its inner periphery to substantially the center of its cross-section.

5. A core element comprising a rubber annulus, substantially solid in cross section, shaped to conform substantially to the interior of a pneumatic tire and adapted to be deformed to bring the bead and sidewall engaging portions into desired position for building the tire carcass.

6. A core element comprising an annulus of deformable material shaped to conform substantially to the interior of a pneumatic tire casing and adapted to be deformed to bring the bead and sidewall engaging portions into desired position for building the tire carcass.

In testimony whereof I have signed my name to the above specification.

GEORGE L. MATHER.